(12) United States Patent
Lim et al.

(10) Patent No.: US 7,564,786 B2
(45) Date of Patent: Jul. 21, 2009

(54) MULTICAST METHOD IN ZIGBEE NETWORK

(75) Inventors: Yu-jin Lim, Seoul (KR); Myung-jong Lee, New York, NY (US); Xu-hui Hu, New York, NY (US); Yong Liu, New York, NY (US); Chun-hui Zhu, New York, NY (US)

(73) Assignees: Samsung Electronics Co., Ltd., Suwon (KR); City University of New York, New York, NY (US)

( * ) Notice: Subject to any disclaimer, the term of this patent is extended or adjusted under 35 U.S.C. 154(b) by 698 days.

(21) Appl. No.: 11/042,063

(22) Filed: Jan. 26, 2005

(65) Prior Publication Data
US 2005/0180447 A1 Aug. 18, 2005

Related U.S. Application Data

(60) Provisional application No. 60/543,656, filed on Feb. 12, 2004.

(30) Foreign Application Priority Data
Oct. 18, 2004 (KR) ........................ 10-2004-0083081

(51) Int. Cl.
*H04J 3/16* (2006.01)
*G06F 15/16* (2006.01)
(52) U.S. Cl. ................... 370/230; 370/465; 709/252
(58) Field of Classification Search ............... 370/230, 370/311, 313, 395.2, 395.31, 425, 432, 351, 370/465, 913; 709/208, 209, 239, 252
See application file for complete search history.

(56) References Cited

U.S. PATENT DOCUMENTS 5,331,637 A * 7/1994 Francis et al. ............... 370/408
5,517,494 A * 5/1996 Green ........................ 370/408

FOREIGN PATENT DOCUMENTS

JP 2001-326681 A 11/2001
WO WO 03/103222 A2 12/2003

OTHER PUBLICATIONS

P1451.5-ZigBee discussion for Sensors Expo, Jun. 7, 2004 [Motorola Labs].*
Aki Anttila, "Multicast routing with AODV Routing protocol", Cygate Networks, Vattuniemenkatu 21, P.O. Box 187, 00201 Helsinki, Finland.

* cited by examiner

*Primary Examiner*—Gregory B Sefcheck
*Assistant Examiner*—Nima Mahmoudzadeh
(74) *Attorney, Agent, or Firm*—Sughrue Mion, PLLC

(57) ABSTRACT

A method to manage nodes in a ZigBee network. In a ZigBee network including a plurality of nodes, a multicast group is generated including at least two nodes among the plurality of the nodes. A multicast group coordinator (GC) which manages the multicast group is set among the nodes forming the multicast group. The multicast group includes the GC, a multicast group member (GM) requesting to join the multicast group, and/or a multicast router (MR) which links GMs to each other or links the GC and the GC. Accordingly, since the GC manages the multicast group, the load is decreased and the packet data transmission rate is enhanced.

28 Claims, 9 Drawing Sheets

| MULTICAST GROUP ADDRESS | GM | GC | THE NUMBER OF CHILD NODES BEING GM OR MR |
|---|---|---|---|

MULTICAST METHOD IN ZIGBEE NETWORK

CROSS-REFERENCE TO RELATED APPLICATIONS

This application claims priority from U.S. Provisional Application No. 60/543,656 filed on Feb. 12, 2004 with the United States Patent and Trademark Office, and Korean Patent Application No. 2004-83081 filed on Oct. 18, 2004 with the Korean Patent Office, the entire disclosures of which are incorporated herein by reference.

BACKGROUND OF THE INVENTION

1. Field of the Invention

The present invention generally relates to a ZigBee network. More particularly, the present invention relates to a method to transmit a multicast data packet to a multicast group consisting of some nodes among nodes forming a ZigBee network.

2. Description of the Related Art

ZigBee Alliance is an association of companies working together to enable cost-effective, low-power, and wireless network products based on IEEE 802.15.4 standard.

Unicast routing protocol of a ZigBee network includes a cluster tree protocol and an Ad hoc On Demand Distance Vector (AODV) protocol. Typically, the ZigBee network supports the unicast routing protocol, but not a multicast routing protocol. However, the concept of the multicast is a noticeable method to effectively support sensor networks in the ZigBee network.

FIG. 1 illustrates a general ZigBee network consisting of a plurality of nodes. Referring now to FIG. 1, descriptions are made on a delivery of a data packet in the ZigBee network consisting of the plurality of the nodes. The ZigBee network consists of nodes A to M. The node A is a ZigBee coordinator (ZC) for managing the nodes forming the ZigBee network. Nodes B to M transmit and receive a data packet under the control of the node A.

The reason for requiring the multicast routing protocol is explained below. It is assumed that the node A transmits the same data packet to the nodes C, E, G, H and I. In this situation, the node A can unicast or multicast the data packet. In detail, the node A unicasts a data packet in which an address of the node C is set to a destination address. In addition, the node A unicasts a data packet in which an address of the node E is set to a destination address. In such a way, the node A unicasts the data packets in sequence, to thus transmit the same data packet (with different destination addresses) to the nodes C, E, G, H and I.

Alternatively, the node A may broadcast the data packet to nodes forming a ZC. In this situation, the node A sets a destination address of the data packet to an address indicating a broadcast packet. Accordingly, the nodes B to M receive the data packet from the node A. However, the nodes B, D, F, and J to M do not need the received data packet, and thus drop the data packet.

As explained above, there is a disadvantage that the packet is not delivered to all of the nodes forming the ZigBee network. That is, in case of unicasting a packet, the transmitting nodes have to transmit packets with different destination addresses several times. Furthermore, overhead increases since undesired nodes receive a broadcast packet.

SUMMARY OF THE INVENTION

To overcome the above disadvantages of the conventional arrangement, an aspect of the present invention provides a method to efficiently transmit data packet to nodes forming a certain group among nodes in a ZigBee network.

Another aspect of the present invention provides a method for nodes forming a ZigBee network to transmit a data packet by use of minimum information so as to reduce requirement for a memory space storing the information.

Still another aspect of the present invention provides a method to decrease a load occurred when each node in a ZigBee network transmits a duplicate data packet.

Yet another aspect of the present invention provides a method to prevent a data packet to be delivered to nodes forming a group from transmitting out of the group.

Consistent with the above aspects of the present invention, a method to manage a ZigBee network including a plurality of nodes, comprises generating a multicast group including at least two nodes among the plurality of the nodes, and setting a multicast group coordinator (GC) which manages the multicast group among the nodes forming the multicast group.

The multicast group comprises the GC, a multicast group member (GM) requesting to join the multicast group, and/or a multicast router (MR) which links the GMs to each other or links the GC and the GC.

BRIEF DESCRIPTION OF THE DRAWING FIGURES

The above and/or other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS

Figure 1:
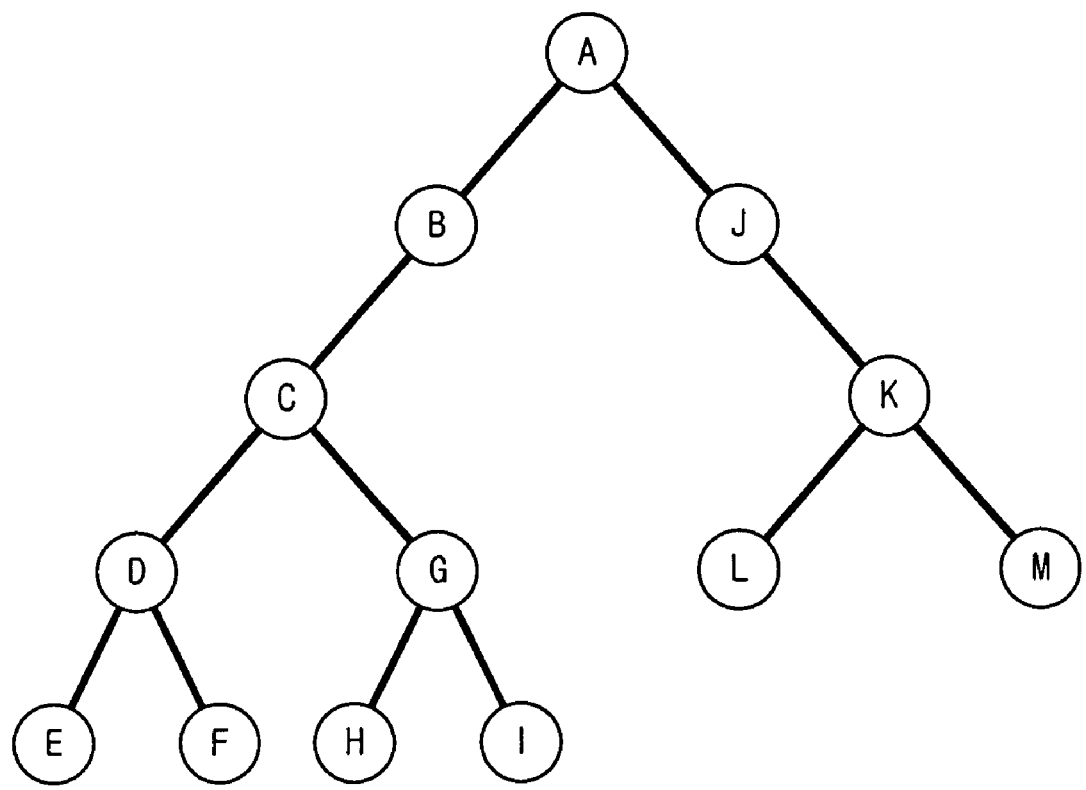
FIG. 1 is a general ZigBee network consisting of a plurality of nodes.

Reference will now be made in detail to the exemplary embodiments of the present invention, examples of which are illustrated in the accompanying drawings, wherein like reference numerals refer to the like elements throughout. The exemplary embodiments are described below in order to explain the present invention by referring to the drawings.

Hereinafter, descriptions are made on operations of nodes forming a ZigBee network according to exemplary embodiments of the present invention in reference with the attached drawings.

The present invention suggests a multicast group including at least two nodes among nodes forming a ZigBee network. The nodes forming the multicast group are assigned with the same multicast group address. The following explains a process for assigning the multicast group address.

A first scheme uses a part of a network layer address as the multicast group address. The address of the network layer includes a personal area network (PAN) ID of 16 bits and a node ID of 16 bits. The assignment of the multicast group address using the PAN ID is explained. The 16-bit address space is divided into two spaces. For example, the 16-bit space may be split into a first space of 4 bits and a second space of 12 bits. A first multicast group address is assigned using 4 bits of the firsts space. That is, the first multicast group address is assigned by selecting one of 16 cases. The first multicast group address is fixed. Next, a second multicast group address is assigned using 12 bits of the second space. The number of the second multicast group address is 4,095 in total (excluding one reserved for broadcasting). The multicast group address is generated by combining the first and second multicast group addresses.

A second scheme utilizes a broadcast address bit of a ZigBee network layer header. In detail, if a destination address is not set in the broadcast address bit, the packet is treated as a regular broadcast data packet. If the destination address is set, it is treated as a multicast data packet.

Figure 2:
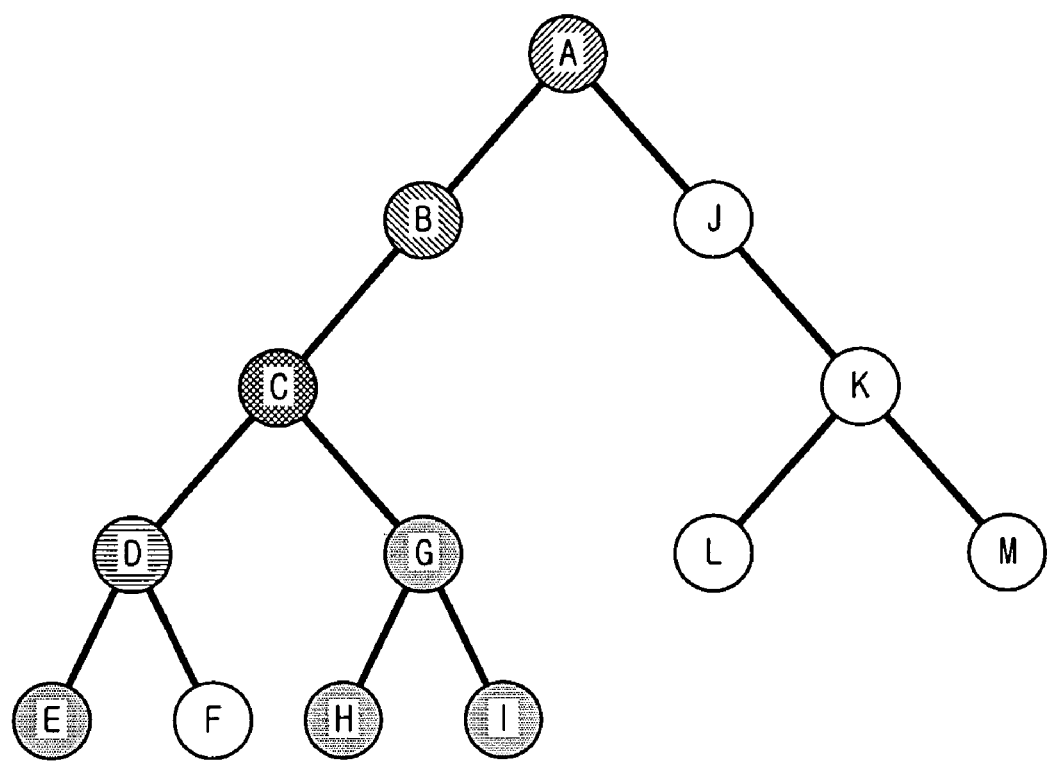
FIG. 2 illustrates nodes forming a ZigBee network according to an exemplary embodiment of the present invention.

FIG. 2 is a ZigBee network including a plurality of nodes according to an exemplary embodiment of the present invention. Referring to FIG. 2, roles of the nodes forming the ZigBee network are explained. The ZigBee network of FIG. 2 includes nodes A to M, like FIG. 1. A node A is a ZigBee coordinator (ZC). The ZC stores information relating to all of the nodes in the ZigBee network, and manages the nodes by use of the stored information. Also, the node A manages information relating to addresses of the nodes in the multicast group and locations of the nodes (in a cluster tree). The node A manages at least one multicast group. Although the node A may join the multicast group, the node A of FIG. 2 does not join the multicast group.

A node B is a sub-multicast router (MR'). The MR' is a node located between a GC and a ZC, to be explained below, in the cluster tree. That is, the MR' has a depth smaller than a depth of the ZC in the cluster tree. The node B recognizes that there is a multicast group down to the tree, and links the ZC and the GC.

A node C is a GC. The GC manages a multicast group. Accordingly, the GC is a node at a location capable of managing the multicast group. That is, the GC becomes an upper bound of the multicast group of the cluster tree. The node C keeps multicast information of nodes forming the multicast group, and manages the nodes based on the information. The node A manages addresses of the nodes of the multicast group, and information relating to locations of the nodes. The GC is a member of the multicast group, but may be a node which does not request to join the multicast group. Thus, the node C can serve as the GC alone if necessary.

A node D is a multicast router (MR). The MR is a node located between a GC and a group member (GM), among nodes which do not request to join the multicast group in the cluster tree. The MR connects the nodes of the multicast group to each other. Referring to FIG. 2, a node E is a GM and the node C is a GC. A node located between GMs along the cluster tree can be the MR.

Nodes E, G, H and I are GMs. The GM is a node forming the multicast group and requesting to join the multicast group. Nodes F, J to M are not multicast group members.

Hereinafter, operations of nodes forming a ZigBee network according to exemplary embodiments of the present invention are explained in detail.

First Exemplary Embodiment

1. Joining a Multicast Group

1) A node wanting to join a multicast group (hereinafter, referred to as a joining node) analyzes its status. If its status is not a MR, a MR', or a ZC, the joining node sends a joining request (JREQ) message to its parent node. If its status is the MR, the joining node changes its status from the MR to a GM and ends the joining process.

If its status is a ZC or the MR', the joining node changes its status to a GC (when the node B requests to join). The joining node changed to the GC generates a GC update (GCUD) message. The joining node changed to the ZC sends the GCUD message down to the cluster tree, and becomes a new GC of the multicast group. The current GC gives up the GC role upon receiving the GCUD message from the new GC, and stops further transmission of the GCUD message (when the node C receives the GCUD message from the node B).

2) A parent node receiving a JREQ message from its child node, checks its neighbor list to find a multicast group address to be assigned to the child node. To be specific, if the status of the parent node is a GM, a MR, a MR', or a GC, the parent node recognizes that there is the multicast group address to be assigned to the child node, and sends a joining reply (JREP) message containing the multicast group address (when the node D receives the JREQ message from the node F). If the status of the parent node is not the GM, the MR, the MR' or the GC, that is, if the parent node is not the multicast group member, the child node sends the JREQ message to its parent node (when the node K receives the JREQ message from the node L). The above process is repeated until the JREQ message reaches the GM, the MR, the MR', the GC, or the ZC.

3) If the JREQ message reaches the ZC, the joining node becomes a first node requesting to join the multicast group (when the JREQ message transmitted from the node L reaches the node A via the nodes K and J). The ZC generates a multicast group address for the joining node, and sends a JREP message with the generated multicast group address to the joining node along the cluster tree. The JREP message sets a GC flag to indicate the joining node to be the GC.

4) Upon receiving the JREP message, the joining node checks whether the GC flag is set. If so, the joining node serves as the GC, or if not, the joining node performs the routing to the multicast cluster tree, and thus the joining node is assigned with the multicast group address from its parent node.

5) The joining node sends the JREQ message up to MaxJoinAttempts times which is set to find the multicast group. Even if the JREP message is not received in reply to the JREQ message, the joining node repeats to transmit the JREP message at a certain interval up to the set times.

Figure 3:
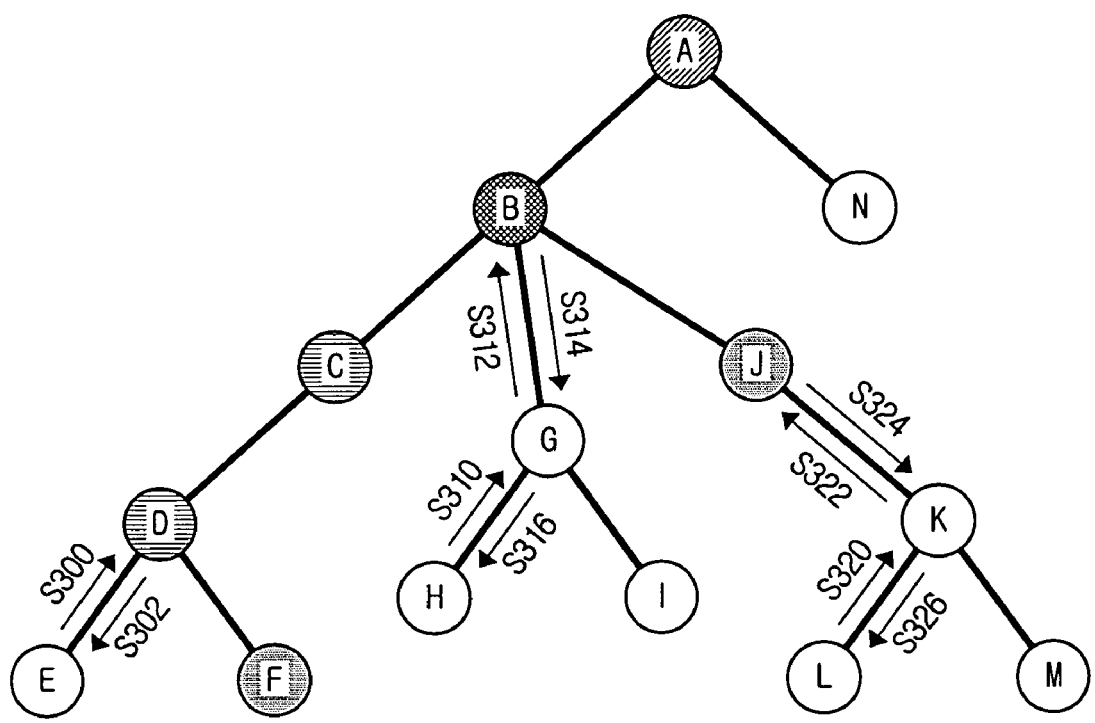
FIG. 3 illustrates an operation of each node when a node requests to join a multicast group according to a first exemplary embodiment of the present invention.

Referring now to FIG. 3, the ZigBee network including joining nodes is described according to the first exemplary embodiment of the present invention. In FIG. 3, nodes E, H and L request to join a multicast group.

The node E sends a JREQ message to a node D (S300). The node D, which is a MR, knows a multicast group address of the multicast group to be joined by the node E. Thus, the node D sends a JREP message with the multicast group address to the node E (S302).

The node H sends a JREQ message to a node G (S310). The node G, which does not know the multicast group address, sends the received JREQ message to a node B (S312). The node B, which knows the multicast group address, sends a JREP message to the node G (S314). The node G forwards the received JREP message to the node H (S316). Upon receiving the JREP message, the node G changes its status into a MR. Operations S320 to S326 are the same as operations S310 to S316.

2. Leaving the Multicast Group

1) A node wanting to leave a multicast group (hereinafter, referred to as a leaving node) determines whether it is a leaf node. If so, the leaving node sends a leaving request (LREQ) message to its parent node. If not, the leaving node changes its status from a GM to a MR. That is, the leaving node serves as a router of the multicast group.

2) Upon receiving the LREQ message from a child node (the leaving node), the parent node sends a leaving reply (LREP) message to the child node. The parent node deletes multicast group information relating to the leaving node.

3) If the child node transmitting the LREQ message is the MR, the parent node checks whether the parent node is the leaf node in the multicast group. If so, the parent node sends a LREQ message to its parent node so as to remove unnecessary parts in the multicast cluster tree, to be explained below in detail in reference to FIG. 4.

4) If the leaving of the child node makes a GC have a single child node in the multicast group, the GC determines whether its status is a GM. If not, the GC gives up the GC role.

5) If all of the child nodes in the multicast group leave, the GC also leaves the multicast group. The GC sends a LREQ message to every MR' and ZC, and deletes all multicast group information.

Figure 4:
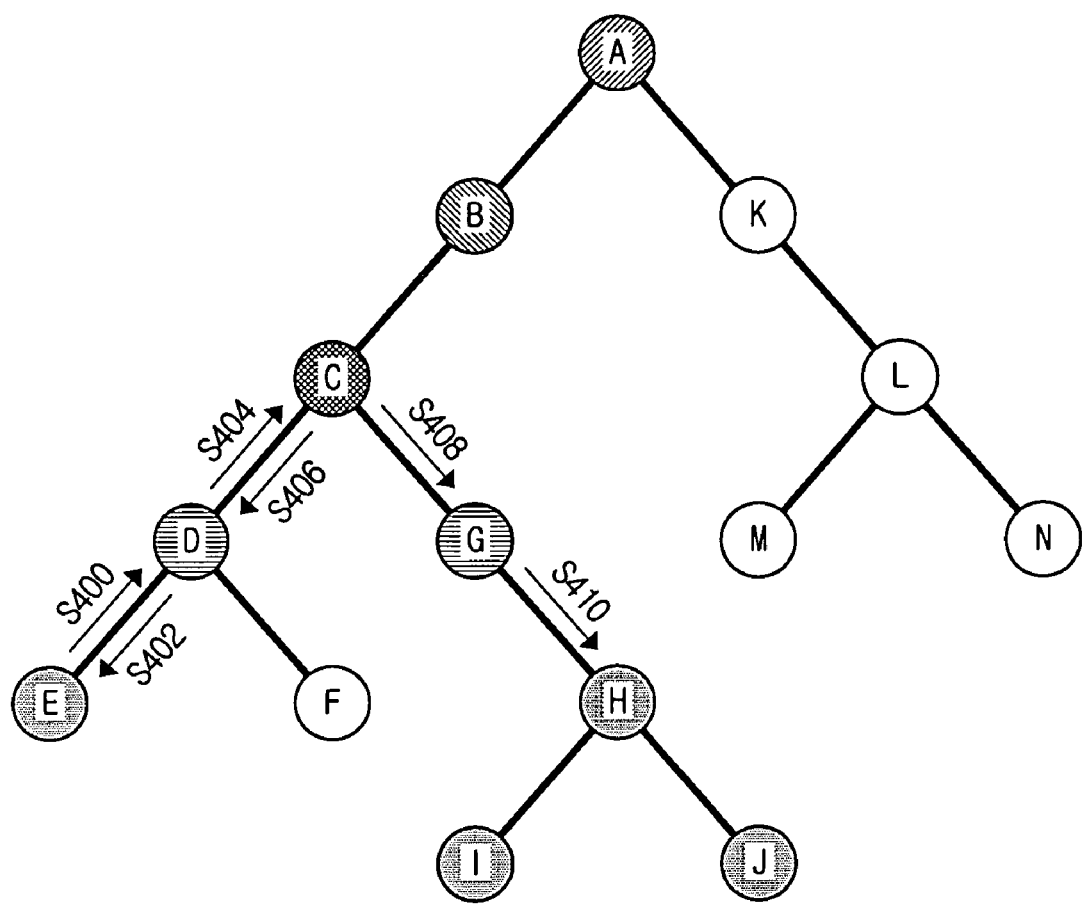
FIG. 4 illustrates an operation of each node when a node requests to leave the multicast group according to the first exemplary embodiment of the present invention.

FIG. 4 is a ZigBee network including a node which requests to leave a multicast group according to the first exemplary embodiment of the present invention. A node E sends a LREQ message to a node D to leave the multicast group (S400). The node D, which is a MR, sends a LREP message to the node E (S402). As the node E leaves the multicast group, the node E recognizes that it is a leaf node in the multicast group.

The node D sends a LREQ message to a node C to leave the multicast group (S404). The node C sends a LREP message to the node D (S406). The node C checks whether its status is a GM. If not, the node C generates a GCUD message to give up the GC role.

The node C sends the GCUD message to a node G (S408). The node G forwards the received GCUD message to a node H (S410). Next, the node C changes its status from the GC to a MR', and the node G changes its status from the MR to a MR'. Upon receiving the GCUD message, the node H changes it status from the GM to a GC.

3. Marking Group Members

Each node in the multicast group updates a multicast cluster tree through the joining and leaving processes. Each node uses a bitmap to record information relating to nodes linked to the multicast cluster tree. Each node marks its connected node of which status is a GM, a GC, and a MR using the bitmap. The bitmap consists of 8, 16, and 32 bits depending on Cm (maximum number of child nodes). In other words, the bit of the bitmap is larger than Cm by one.

Bit 0 of the bitmap represents a parent node, and bit n represents a n-th child node. For example, bit 0, 2 and 5 is marked as '1', a parent node, $2_{nd}$ child node and $5_{th}$ child node are one of a GM, MR, and GC. The usage of the bitmap enables each node to reduce a memory space required to record the nodes connecting the multicast cluster tree. In further detail, the address of the node is typically 16 or 32 bits, and accordingly, the required memory space is proportional to the number of the connected nodes. The bitmap enables to mark 8 nodes using a single bitmap. The memory space is dramatically saved by use of the bitmap, instead of a multicast routing table.

4. GC Role Migration

A GC role prevents multicast packets from being transmitted outside the multicast cluster tree. An upper bound of the multicast cluster tree is set by the GC. Meanwhile, the upper bound of the multicast cluster tree is not fixed but flexible due to nodes joining or leaving the multicast group. The following explains that a GC role of a node is migrated.

1) New GM Joins a Multicast Group

Figure 5:
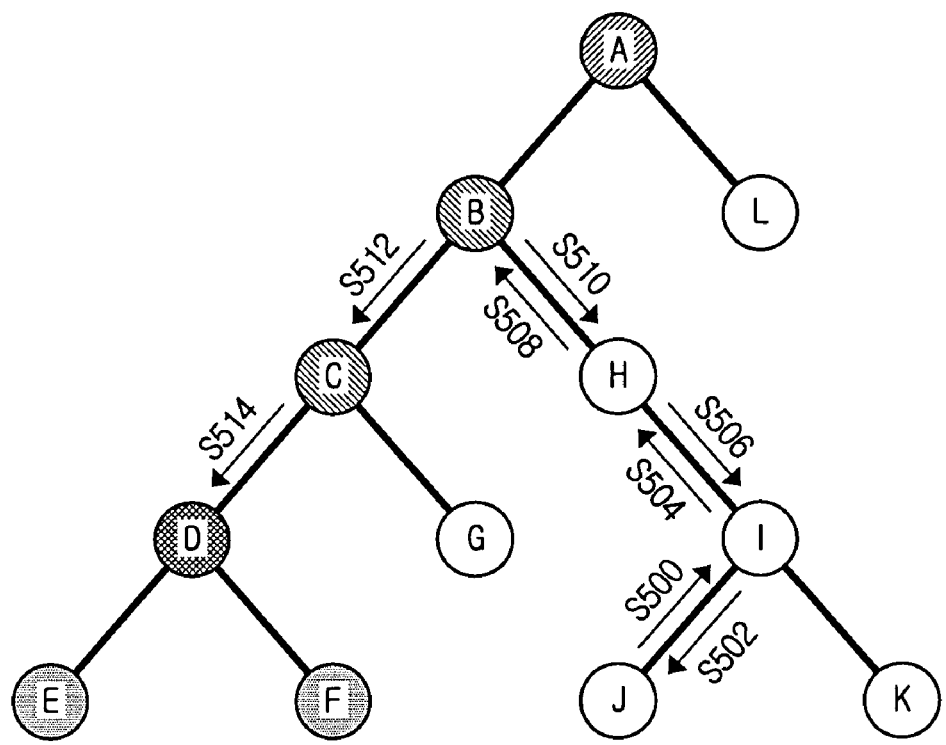
FIG. 5 illustrates an update of a node serving as a group coordinator (GC) of the multicast group according to the first exemplary embodiment of the present invention.

FIG. 5 illustrates message transmissions when a new GC requests to join a multicast group and a GC role is migrated according to the first exemplary embodiment of the present invention. Referring to FIG. 5, a node D is the GC, and nodes B and C are MR'.

In FIG. 5, a node J is a joining node that requests to join the multicast group. The node J sends a JREQ message to a node I (S500). The node I forwards the received JREQ message to a node H (S504). The node H forwards the JREQ message to a node B (S508). The node B, which knows a multicast group address, generates and sends a JREP message to the node H (S510). The node H forwards the received JREP message to the node I (S506), and the node I forwards the JREP message to the node J (S502). Therefore, the node J joins the multicast group. It is noted that the nodes H and I change their status into a MR.

After sending the JREP message, the node B generates and sends a GCUD message to a node C (S512). The node B changes its status into a GC. Upon receiving the GCUD message, the node C changes its status from a MR' to a MR. The node C, which is a MR' as an original status, forwards the received GCUD message to a node D (S514). To be brief, the GCUD message is forwarded in sequence until it reaches a current GC. The node D, which is the current GC, receives the GCUD message and gives up its GC role. If the original status of the node D is a GM, the status is changed to a GM. If the original status is not the GM, the node D changes into a MR.

2) Current GC Leaves

The current GC leaves in two cases. One is when a GM and GC leaves, and the other is when a GC, which is not a GM, has only one child node in the multicast group due to the leaving of its a child. In both cases, the GC gives up the GC role for the multicast group. Hereinafter, the following description is made on a ZigBee network required for the leaving of the current GC in reference to FIG. 6, in which a node C is the GC.

Figure 6:
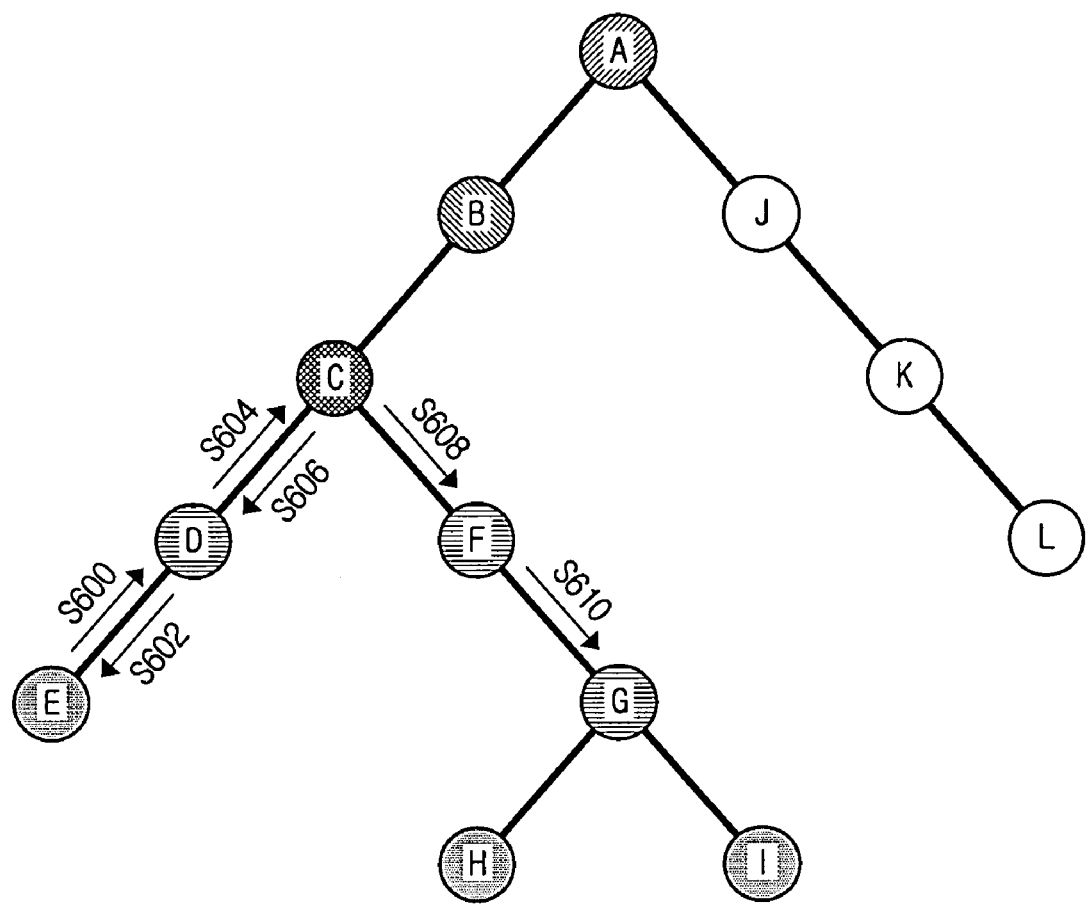
FIG. 6 illustrates an operation of each node when the GC of the multicast group requests to leave according to the first exemplary embodiment of the present invention.

A node E sends a LREQ message to a node D along a multicast cluster tree (S600). Upon receiving the LREQ message, the node D sends a LREP message to the node E and checks its status. If its original status is a GM, the node D changes into a GM. In contrary, the node D serves as a MR due to the node E even though the node D originally is a non-multicast group node as shown in FIG. 6. As the node D recognizes the absence of a child node in the multicast group, the node D sends a LREQ message to the node C (S604). The node C sends back a LREP message to the node D (S606), and thus the node D changes into the non-multicast group node.

After sending the LREP message, the node C checks its own status. If it is a GM, the node C still serves as the GC. If it is not the GM and only one child node is present for the multicast group, the node C needs not to serve as the GC any more. Accordingly, the node C changes its status to a non-multicast group node and sends the generated GCUD message to a node F (S608). Upon receiving the GCUD message, the node F checks the number of child nodes forming the multicast group to which the node F is linked. If the number of the child nodes is more than two, the node F changes its status into a GC and stops further message transmission. If the number of the child nodes is one, the node F changes into a non-multicast group node and forwards the GCUD message of operation S610 to a node G. Likewise, the node G checks the number of child nodes forming the multicast group to which the node G is linked. In FIG. 6, the number of the child nodes in the multicast group is two (nodes H and I), and thus the node G changes from a MR to a GC.

5. Multicast Group Dismissal

When an operation relating to a multicast group finishes, one of nodes forming the multicast group generates a group dismiss (GDIS) message. An application layer of the node determines whether the generated GDIS message is correct (erroneous). The generated GDIS message is sent to all of the nodes in the multicast group. Upon receiving the GDIS message, the nodes delete all multicast group information. The GDIS message reduces a control traffic through the same process as the leaving of the GM described above.

6. Data Packett Transmission Mechanism

When a multicast data packet transmission is requested by an application layer, a network layer of a source node sets a destination address of a network header as a multicast address. The MAC layer sets a destination address of a MAC frame as a broadcast address. A MAC layer of the source node broadcasts a packet with the destination address (destination PAN ID) and the MAC address being set.

MAC layers of neighbor nodes receive and pass the broadcast packet to their network layers. The network layers determine whether it is necessary to process the multicast data packet and how to process the packet by checking the broadcast address and the destination address in the network header. An operation of the nodes receiving the data packet is described in detail.

1) GM Receives a Data Packet

If a previous hop of the received data packet is a neighbor node of a multicast cluster tree (parent node or child node), a GM passes the received data packet to an upper layer. If the previous hope of the data packet is not the neighbor node of the multicast cluster tree, the received data packet is rebroadcast. If the GM is a leaf node, the received data packet is not rebroadcast.

2) MR Receives a Data Packet

A MR does not pass the received data packet to an upper layer. Other operations of the MR are the same as the GM.

3) MR' or ZC Receives a Data Packet

If the previous hop of the received data packet is not a child node in the multicast cluster tree, a MR' or a ZC unicasts the data packet to its child node along the multicast cluster tree. That is, the MR' or the ZC sends the data packet to the multicast group. If the previous hop of the data packet is a child node out of the multicast cluster tree, the MR' or the ZC unicasts the data packet to its child node along the multicast cluster tree.

If the previous hop of the received data packet is a child node in the multicast cluster tree, the MR' or the ZC discards the data packet. That is, the MR' or the ZC blocks the data packet from transmitting out of the multicast group. This happens when a parent node being a MR' receives the data packet broadcast by the GC.

4) Others (Non-multicast Group Node Receives a Data Packet)

To send the received data packet to the multicast group, a non-multicast group node sends the data packet to its parent node along the multicast cluster tree toward a ZC. When the data packet hits a MR' during the transmission toward the ZC, the MR' passes the received data packet to its child node in the multicast cluster tree without passing the data packet to the ZC.

7. Preventing Duplicate Packets

1) Multicast Transaction Record (MTR)

Each node maintains a multicast transaction table (MTT). Entries of the MTT include a multicast address (destination address), a source address, and a sequence number of a packet. The network layer of a node can allot 2-byte multicast group address, 2-byte source address, and one-byte sequence number of the packet for the multicast group. If a PAN ID is required, more than four bytes are needed for the multicast group address and the source address. Each node can prevent duplicate transmissions and receptions by comparing information of the received packet with that of the MTT.

However, the above solution, which consumes the memory, is not suitable to a RN–. The RN– is a node having a limited memory space (capacity).

2) Bitmap

A bitmap is utilized when a length of the bitmap is one byte in maximum (Cm≦7). A node sends its bitmap using a sequence number field (1 byte) in a network packet header. The sequence number checks a bit of the bitmap corresponding to a parent node or a child node which is to process the received packet. A node receiving the packet determines whether the bitmap in the received packet is checked. If the bitmap is not checked, the received packet is discarded without further transmission or propagation. In result, the duplicate transmissions of the packet are prevented. To this end, each node has to know that it is the n-th child node of its parent node, which is possible according to a cluster tree construction algorithm.

By using the above solution, each node needs not to use the MTT and extra space is not needed for the data packets at the network layer. However, the solution using the bitmap is not available when the bitmap is greater than one byte because the sequence number field is one byte.

3) Transmitting Previous Hop Address Along With Data Packet

This method is available even when the length of the bitmap is greater than 1 byte. If the bitmap is more than one-byte long, it is not possible to place the bitmap in the sequence number field of the network header. Accordingly, the data packet together with the previous hop address is transmitted.

A node puts its address into the packet before relaying the multicast packet. A node receiving the multicast data packet checks an address in the multicast data packet. When the address in the multicast data packet is the same as its address, the receiving node discards the received multicast data packet. If the two addresses are different from each other, the receiving node performs a corresponding operation.

This solution is possible only when the multicast packet is transmitted following the multicast cluster tree structure. The previous hop address is carried using 2 or 4 bytes of a payload at the network layer.

8. Method to Enhance Data Packet Transmission

1) To reduce overhead due to a broadcast data packet, each node broadcasts or rebroadcasts a multicast data packet only if there are more than two neighbor nodes in the multicast cluster tree. If there are less than two neighbor nodes, each node unicasts the packet.

2) Addition to the basic algorithm to transmit the broadcast packet along the multicast cluster tree, it is possible to transmit the packet to a sibling node being a GM or a MR to expedite the packet delivery. In this situation, the MTR is used to prevent duplicate transmission of the data packet.

9. Operation of Non-Multicast Group Member

1) A non-multicast group member sends packets to the multicast group but does not receive packets from the multicast group.

2) The non-multicast group member unicasts packets toward a ZC if the non-multicast group member is not linked to the multicast tree.

3) When the non-multicast group member, which is neither a MR' nor a ZC, receives a unicast packet, the non-multicast group member forwards the received packet to its parent node.

4) A MR' or a ZC, which keeps the multicast group information, unicasts a received data packet to the multicast group following the multicast cluster tree.

Second Exemplary Embodiment

Nodes forming the ZigBee network are classed into a RN− and a RN+ depending on a memory space. The RN− has a relatively limited memory comparing with the RN+. A multicast method according a second exemplary embodiment of the present invention is available with respect to the RN− having the memory limitation. A basic idea of the second exemplary embodiment of the present invention is that a source node sends a generated multicast data packet first to a ZC.

1. Joining a Multicast Group

Members (nodes) of each multicast group record the number of descendant nodes in the multicast group NumDesMem. If the NumDesMem of a multicast group member is 0, the member is a leaf node. The following describes that a non-multicast group node requests to join the multicast group. When a MR requests to join the multicast group, the MR simply changes its status into a GM.

1) A node to join the multicast group sends a JREQ message to a ZC.

2) The ZC calculates a new GC upon the receipt of the JREQ message. If the new GC is different from a current GC, the ZC sends a GCUD message to both the current GC and the new GC.

3) The ZC sends a JREP message to the new joining node following the multicast cluster tree.

4) Upon receiving the JREP message, a node along the multicast cluster tree path increases the NumDesMem by one.

5) In further detail, if a GM or a MR receives the JREP message, the GM or the MR increases the NumDesMem, and if a non-multicast group node receives the JREP message, its status is changed into a MR and the NumDesMem is set to 1.

2. Leaving the Multicast Group

1) A node to leave the multicast group sends a LREQ message to a ZC.

2) The ZC calculates a new GC upon the receipt of the LREQ message. If the new GC is different from a current GC, the ZC sends a GCUD message to both the current GC and the new GC.

3) The ZC sends a LREP message to the leaving node following the multicast cluster tree path.

4) Upon receiving the LREP message, a node along the multicast cluster tree path decreases the NumDesMem by one.

5) In further detail, if a GM or a MR receives the JREP message, the GM or the MR decreases the NumDesMem by one. When the NumDesMem becomes 0, the GM or the MR becomes a leaf node, and especially, the MR becomes a non-multicast group node. If the GM receives the LREP message, the GM becomes a MR (when there is a GM or a MR descendant node along the cluster tree path, that is, when the NumDesMem is more than one), or, the GM becomes a non-multicast group node (when the NumDesMem is 0).

3. Data Packet Transmission Mechanism

1) When a multicast data packet is generated, a source node unicasts the multicast data packet toward a ZC.

2) If a GC is located between the source node and the ZC along a multicast cluster tree path, the GC does not forward the received multicast data packet to its parent node but broadcasts the multicast data packet to its child nodes following the multicast cluster tree.

3) If the GC is not between the source node and the ZC along the multicast cluster tree path, the ZC forward the multicast data packet to the GC. The GC broadcasts the received multicast data packet to its child nodes following the multicast cluster tree.

4) If a leaf node receives the multicast data packet, there is no further transmission. If a MR receives the multicast data packet, the MR broadcasts the received multicast data packet to its child nodes following the multicast cluster tree.

5) If a non-multicast group node receives the multicast data packet, there is no further transmission.

According to the second exemplary embodiment of the present invention, the duplicate transmissions of the data packet are prevented without having to use the MTR because the data packet from the parent node is broadcast to its childe nodes.

Third Exemplary Embodiment

According to a third exemplary embodiment of the present invention, a memory required to multicast a packet is reduced further than the second exemplary embodiment of the present invention. The third exemplary embodiment of the present invention does not utilize the concept of the MR' as in the first or second exemplary embodiment of the present invention.

1. Multicast Routing Table (MRT)

Figures 7, 8:
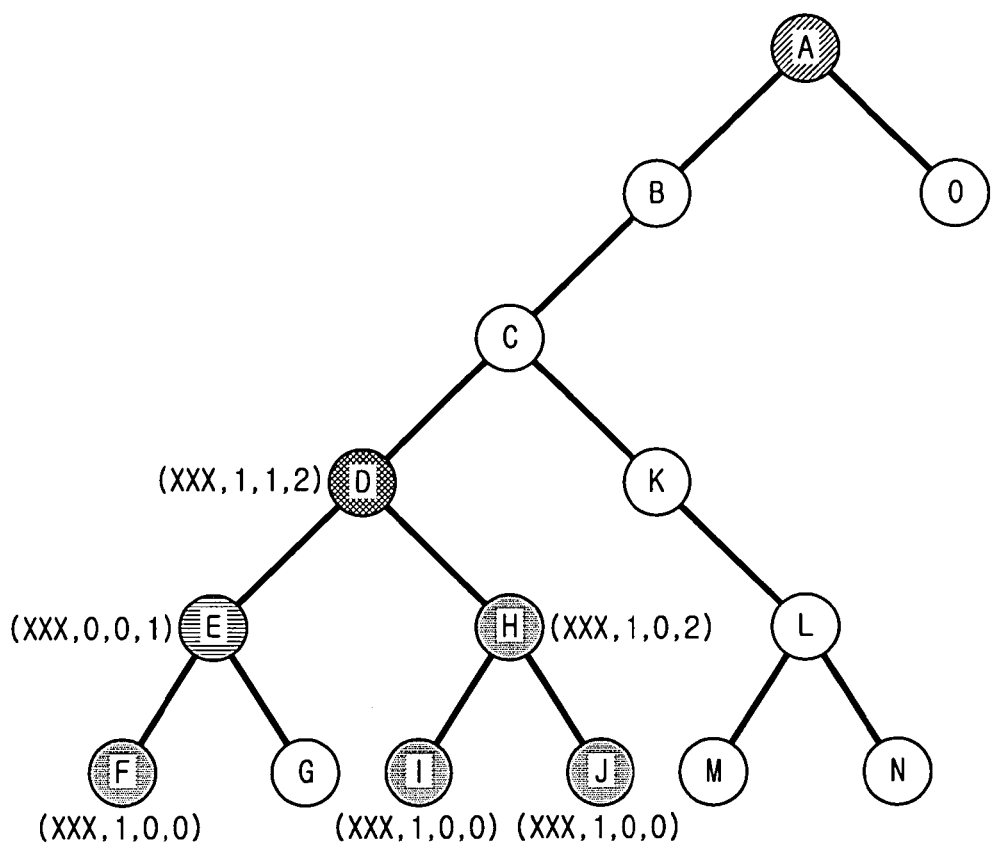
FIG. 7 illustrates an exemplary multicast routing table according to a third exemplary embodiment of the present invention.
FIG. 8 illustrates the multicast routing table stored by nodes forming a ZigBee network according to the third exemplary embodiment of the present invention.

According to the third exemplary embodiment of the present invention, a multicast routing table (MRT) for multicast addresses is suggested. FIG. 7 illustrates the MRT which includes a multicast group address field, a GM field, a GC field, and a number of child nodes being GM or MR field. The multicast group address field is 16 to 32 bits, and the GM field and the GC field respectively are one bit. If a node is a GM, the node checks the GM field, and if the node is a GC, the node checks the GC field. The number of child nodes being GM or MR field is 6 bits. However, the bits of each field may vary according to the user's set. The number of child nodes being GM or MR field is different from the NumDesMem of the second exemplary embodiment of the present invention. The number of child nodes being GM or MR field counts child nodes along the multicast cluster tree, while the NumDesMem of the second exemplary embodiment of the present invention counts descendant nodes along the multicast tree.

FIG. 8 illustrates an exemplary MRT of each node forming a multicast cluster tree. Referring to FIG. 8, in the third exemplary embodiment of the present invention, the concept of the MR' is not utilized but the MR' is regarded as a general non-multicast group node. A node D maintains a MRT of (xxx, 1, 1, 2). An address of the multicast group is "xxx", and the node is both a GM and a GC. The number of child nodes being GM or MR of the node D is two (nodes E and H). A node E maintains a MRT of (xxx, 0, 0, 1). The multicast group address is "xxx", and the node E is neither a GM nor a GC. The number of child nodes being GM or MR of the node D is one (node F).

2. Joining a Multicast Group

Figure 9:
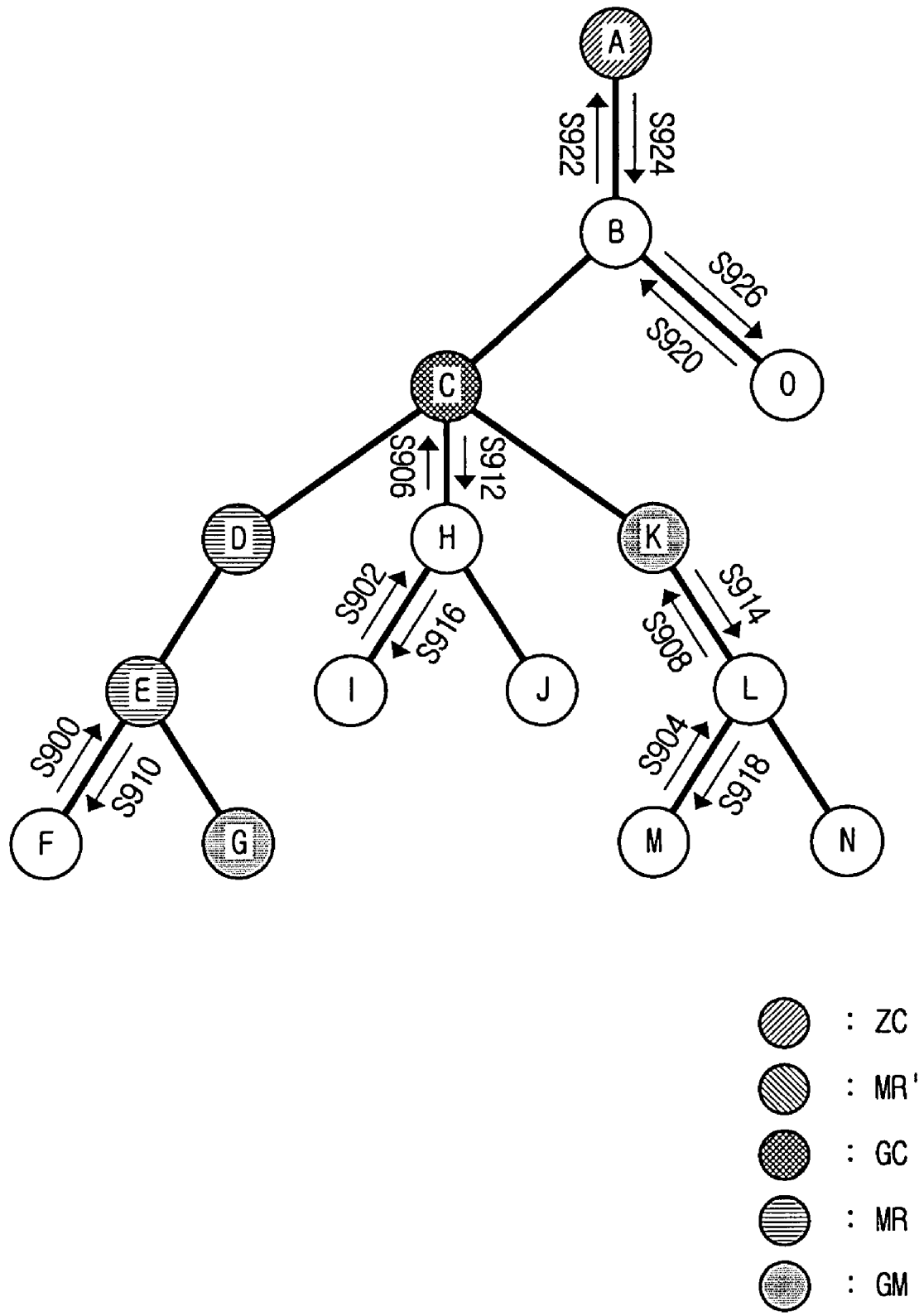
FIG. 9 illustrates an operation of each node when a node requests to joint a multicast group according to the third exemplary embodiment of the present invention.

FIG. 9 illustrates a ZigBee network including nodes requesting to join a multicast group according to the third exemplary embodiment of the present invention. Hereinbelow, operations of the nodes requesting to join the multicast group are explained in reference to FIG. 9.

Nodes F, I and M request to join the multicast group independently from each other. Thus, the node F unicasts a JREQ message to a node E (ZC) along the cluster tree (S900). The node I unicasts a JREQ message to a node H (S902), and the node M unicasts a JREQ message to a node L (S904).

Upon receiving the JREQ message from the node F, the node E keeping a MRT stops further transmission of the received JREQ message. That is, a node keeping its MRT stops further transmission of a received JREQ message. The node H, which does not keep a MRT, forwards the received JREQ message to a node C (child node) upon receiving the JREQ message from the node I (S906). The node L forwards the JREQ message to a node K (child node) upon receiving the JREQ message from the node M (S908).

The nodes E, C and K receiving the JREQ message update their MRT. In detail, the nodes E, C and K increase the number of child nodes being GM or MR by one, and generate a JREP message in response to the JREQ message. The JREP message includes information relating to the multicast group. The JREP message is sent to the node which generated the JREQ message. The node E sends a JREP message to the node F (S910), and the node H sends a JREP message to the node H (S912). The node K sends a JREP message to the node L (S914).

Upon receiving the JREP message, the node H changes its status to a MR and generates a MRT. The number of child nodes being GM or MR of the generated MRT is set to one. The node H forwards the received JREP message to the node I. Likewise, the node L performs the same operation as the node H.

The node H forwards the JREP message to the node I (S916), and the node L forwards the JREP message to the node M (S918).

The nodes F, I and M receiving the JREP message change their status into a GM and generate a MRT. The number of child nodes being GM or MR of the generated MRT is set to zero.

The transmission of the JREQ message to a ZC is described below. It is exemplified that a node D requests to join a multicast group.

A node O sends a JREQ message to a node B (S920). Upon receiving the JREQ message from the node O, the node B forwards the JREQ message to the node A (parent node) (S922). The node A generates a JREP message in response to the JREQ message, and sends the generated JREP message to the node B (S924). The node B forwards the received JREP message to the node O (S926). The operation of the node B is the same as that of the node H, and the operation of the node O is the same with that of the node I. The node A, after sending the JREP message, determines a new node for the GC role.

As described above, a ZC keeps information relating to a plurality of multicast groups. The node A generates a GCUD message indicating that the node B serves as a GC, and sends the generated GCUD message to both the current GC (node C) and the new GC (node B). Upon receiving the GCUD message, the node B updates some information of the MRT to serve as the GC. To be specific, the node B sets the GC field to "1". The node C, upon receiving the GCUD message, also updates some information of the MRT. The node C changes the GC field from "1" to "0".

Addition to the above methods, the node A sends a GCUD message to the current GC (node C) along the cluster tree. The GCUD message contains an address of the current GC and an address of the new joining member (node O). Upon receiving the GCUD message, the node B determines whether the new joining member is its descendant node. As the new joining member is its descendant node according to the determination, the node B forwards the GCUD message to the node C.

Since the node C recognizes the new joining member is not its descendant node, the node C sets its parent node (node B) as a new GC. The node C stops further transmission of the GCUD message. The node C sends a GCUD ACK message to its parent node. Upon receiving the GCUD ACK message, the node B generates a MRT and updates information of the generated MRT. The node C also updates its MRT.

3. Leaving the Multicast Group

1) A leaf GM sends a LREQ message to its parent node to request to leave the multicast group. Upon receiving the LREQ message, the parent node decreases the number of child nodes being GM or MR by one and sends a LREP message to the leaf GM.

2) If a status of a MR sending the LREP message is a leaf node along the multicast tree, the MR also sends a LREQ message to its parent node. The parent node of the MR sends a LREP message to the MR, and decreases the number of child nodes being GM or MR by one.

3) Due to the nodes leaving the multicast group, the MR being the leaf node of the multicast group stops further transmission of the received data packet.

4) If a GC which does not serve the GC role has only one of a GM or a MR child node due to the nodes leaving the multicast group, the GC sends a GCUD message. Upon receiving the GCUD message, the GM performs a new GC role. The GC sends a GCUD ACK message indicating that the GC is changed into a ZC.

5) Upon the receipt of the GCUD message, the MR counts the number of child nodes being GM or MR. If the number of child nodes being GM or MR is at least two, the MR serves as a new GC. The MR sends to a ZC a GCUD ACK message indicating the change of the GC. If the number of child nodes being GM or MR is one, the MR sends the GCUD message to the child nodes being GM or MR.

6) When the GM leaving the multicast group does not have any child node being GM or MR, the GM deletes the MRT. In the event that the GM leaving the multicast group has at least one child node being GM or MR, the GM serves as a MR.

7) If all child nodes being GM or MR leave the multicast group, the MR (parent node) deletes the MRT.

4. Data Packet Transmission Mechanism

Figure 10:
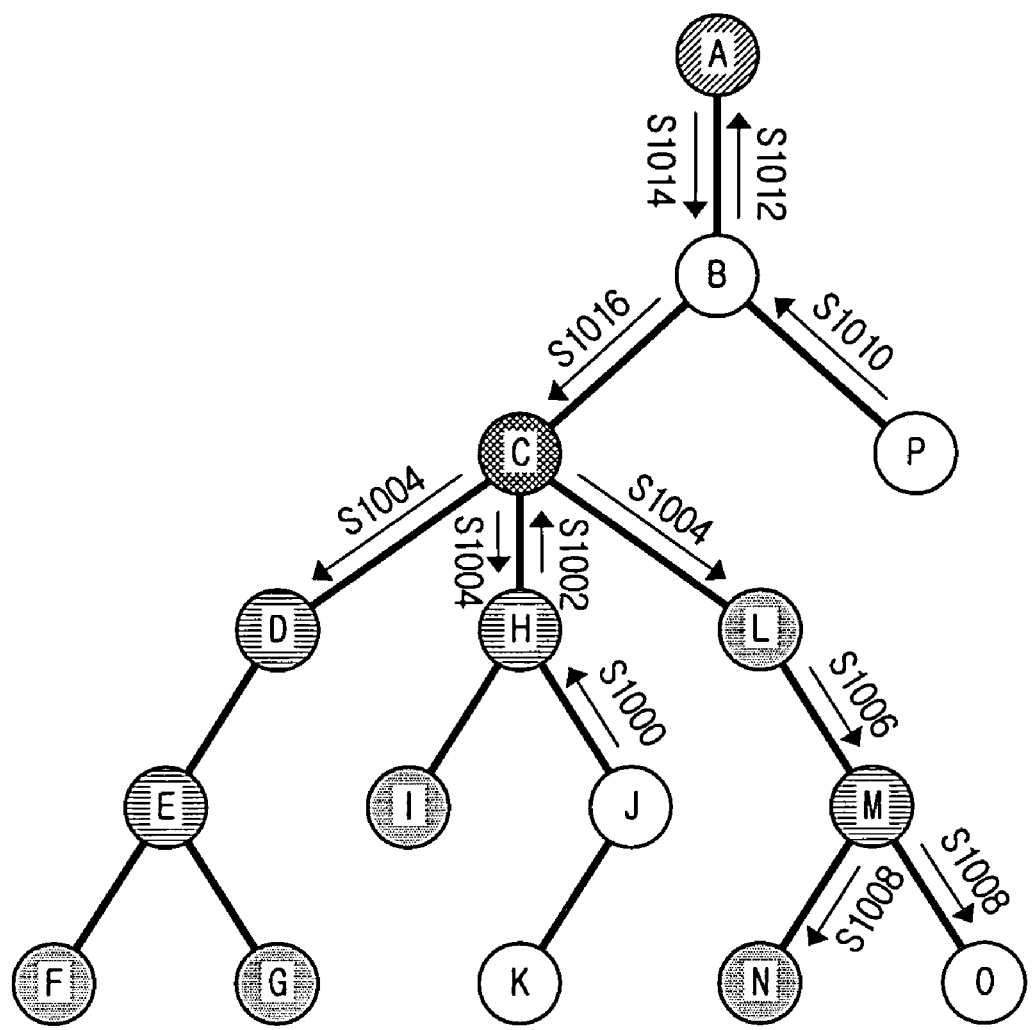
FIG. 10 illustrates an operation of each node when a data packet is delivered to the multicast group according to the third exemplary embodiment of the present invention.

FIG. 10 illustrates that a data packets is delivered to the multicast group according to the third exemplary embodiment of the present invention.

When there is a data packet to be delivered to a multicast group, a node J unicasts the data packet to a node H (S1000). The node H unicasts the received data packet to a node C (S1002). The node C being a GC does not unicasts the received data packet to a ZC. Instead, the node C broadcasts the data packet to its child nodes (nodes D, H and L).

The node L receiving the data packet from the node C sends the data packet to its higher layer. The node L, which has child nodes being GM or MR, rebroadcasts the data packet (S1006).

Upon receiving the data packet, a node M being a MR does not forward the data packet to its higher layer. Since the node M has child nodes being GM or MR, the node M rebroadcasts the data packet (S1008). A node N receiving the data packet forwards the data packet to its higher layer, and does not rebroadcast the data packet because the node N is a leaf node. A node O discards the received data packet.

Likewise, nodes D and H perform the same operation as the node L, and thus the description is omitted for the conciseness. The following explains that a node P, which is not a descendant node of a GC, generates a data packet to be delivered.

A node which wants to transmit a data packet to the multicast group, unicasts the data packet to a ZC (node A). When there is a data packet to be delivered to the multicast group, the node P unicasts the data packet to a node B (S1010). The node B unicasts the received data packet to the node A (S1012). Upon receiving the data packet, the node A forwards the data packet to the node B so as to transmit the data packet to the node C being a GC (S1014). The node B forwards the received data packet to the node C (S1016). The following operation is omitted for the clarity.

Hereinbelow, it is explained that a plurality of data packets are transmitted from a same source node to the multicast group. Especially, it is explained that a data packet is transmitted from a node which is not a descendant node of a GC.

Upon receiving the data packet, the node C, which is a GC, sends a proxy discovery packet to the node A following the cluster tree. The proxy discovery packet contains a source node address and a multicast group address. The node A can generate and send a proxy discovery packet to the node C following the cluster tree.

The proxy discovery packet from the node C is transmitted to the node A until a source node and an ancestor node having a GC as a descendant node receive the proxy discovery packet. In other words, the node B is an ancestor node having the source node (node D) and the node C (GC) as descendant nodes. Afterward, the node B serves as a proxy node. The node B generates a temporal routing table. The temporal routing table contains a multicast group address, a GC address, an expiration time, and a source node address.

The node B does not forward the received data packet from the node C to the node A, but forwards the data packet directly to the node C using the temporal routing table.

As aforementioned, the first exemplary embodiment of the present invention utilizes not the multicast routing table but the bitmap, and thus reduces the memory space. Since the multicast data packet is transmitted only to the nodes forming the multicast group, the data packet can be delivered promptly. In addition, the duplicate transmissions of the data are prevented so as to reduce load of each node. The second exemplary embodiment of the present invention counts the number of descendant nodes, instead of the routing table, to thus reduces the memory space. As data packet only from the parent node is received, the duplicate data packet transmissions are prevented. According to the third exemplary embodiment of the present invention, the one-byte MRT is used so as to save the memory space, and the data packet from the parent node is received so as to prevent the duplicate data packet transmissions. Furthermore, the multicast group is updated in real-time so that the multicast group of minimal size is guaranteed.

While the exemplary embodiments of the present invention have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. A method of managing a ZigBee network including a plurality of nodes, the method comprising:
    generating a multicast group which includes at least two nodes among the plurality of the nodes; and
    setting a multicast group coordinator (GC) which manages the multicast group among the at least two nodes forming the multicast group,
    wherein the multicast group comprises at least one of the GC, a multicast group member (GM) requesting to join the multicast group, and a multicast router (MR) which lines GMs to each other or links the GC and the GM,
    wherein the ZigBee network comprises a ZigBee coordinator (ZC), and a sub-multicast router (MR') which links the ZC and the GC.

2. The method of claim 1, wherein the MR changes its status to a GC if the MR requests to join the multicast group.

3. The method of claim 1, wherein the ZC or the MR' changes its status to a GC and sends a GC update (GCUD) message indicating the change of the GC to a current GC if the ZC or the MR' request to join the multicast group.

4. The method of claim 1, wherein a first node which is a non-multicast group member sends a joining request (JREQ) message to a first parent node, which is a parent node of the first node, to request to join the multicast group.

5. The method of claim 4, wherein, if the first parent node receiving the JREQ message is a GM, a MR, a GC, or a MR', the first parent node sends a joining reply (JREP) message containing a multicast group address to the first node sending the JREQ message.

6. The method of claim 4, wherein, if the first parent node receiving the JREQ message is a non-multicast group member, the first parent node sends the received JREQ message to a second parent node which is a parent node of the first parent node, sends a JREP message received from the second parent node to the first node, and changes its status into a MR.

7. The method of claim 6, wherein, if a parent node receiving the JREQ message is a ZC, the ZC instructs the first node change its status to a GC.

8. The method of claim 1, wherein, if a GM requesting to leave the multicast group is a leaf node of the multicast group, the GM changes its status to a non-multicast group member, and
    if the GM is not the leaf node, the GM changes its status to a MR.

9. The method of claim 8, wherein, if a parent node is a MR and a leaf node of the multicast group due to a child node leaving, the MR leaves the multicast group.

10. The method of claim 8, wherein, if the GC has a child node which is a GM or a MR due to the child node leaving and does not serve as a GM at the same time, the GC gives up its status as the GC.

11. The method of claim 10, wherein the GC sends a GC update (GCUD) message indicating to change the GC into a child node which is a GM or a MR.

12. The method of claim 11, wherein, if a node receiving the GCUD message is a GM, the node changes the GM into a GC, and if the node receiving the GCUD message is a MR, the node counts a number of child nodes which is a MR or a GM.

13. The method of claim 12, wherein, if the number of the child nodes which are the MR or the GM is at least two, the MR receiving the GCUD message changes its status into a GC, and if there is one child node which is the MR or the GM, the MR change the status into a non-multicast group member and sends the GCUD message to the child node.

14. A method of managing a ZigBee network including a plurality of nodes, the method comprising:
generating a multicast group which includes at least two nodes among the plurality of the nodes; and
setting a multicast group coordinator (Ge) which manages the multicast group among the at least two nodes forming the multicast group,
wherein the multicast group comprises at least one of the GC, a multicast group member (GM) requesting to join the multicast group, and a multicast router (MR) which lines GMs to each other or links the GC and the GM,
wherein a node forming the multicast group stores a number of descendant nodes which are a GM or a MR, and
wherein a non-multicast group node requesting to join the multicast group sends a joining request (JREQ) message to a ZigBee (ZC) along the cluster tree.

15. The method of claim 14, wherein the ZC receiving the JREQ message determines a new GC, and sends a GC update (GCUD) message indicating the change of the GC to a current GC and the new GC if the new GC is different from the current GC.

16. The method of claim 14, wherein an intermediate node, which receives a joining reply (JREP) message allowing the joining from the ZC, increases a number of descendant nodes being a GM or a MR by one.

17. A method of managing a ZigBee network including a plurality of nodes, the method comprising:
generating a multicast group which includes at least two nodes among the plurality of the nodes; and
setting a multicast group coordinator (GC) which manages the multicast group among the at least two nodes forming the multicast group,
wherein the multicast group comprises at least one of the GC, a multicast group member (GM) requesting to join the multicast group, and a multicast router (MR) which lines GMs to each other or links the GC and the GM,
wherein a node forming the multicast group stores a number of descendant nodes which are a GM or a MR, and
wherein a GM requesting to leave the multicast group sends a leaving request (LREQ) message to the ZC following the cluster tree.

18. The method of claim 17, wherein the ZC receiving the LREQ message determines a new GC, sends a GCUD message indicating the change of the GC to a current GC and the new GC if the new GC is different from the current GC.

19. The method of claim 17, wherein an intermediate node, which receives a leaving reply (LREP) message allowing the leaving from the ZC, decreases the number of descendant nodes which are a GM or a MR by one.

20. The method of claim 17, wherein the GM requesting to leave the multicast group and receiving a leaving (LREP) message, changes its status into a MR if the number of child nodes which are a GM or a MR is at least one.

21. A method of managing a ZigBee network including a plurality of nodes, the method comprising:
generating a multicast group which includes at least two nodes among the plurality of the nodes; and
setting a multicast group coordinator (GC) which manages the multicast group among the at least two nodes forming the multicast group,
wherein the multicast group comprises at least one of the GC, a multicast group member (GM) requesting to join the multicast group, and a multicast router (MR) which lines GMs to each other or links the GC and the GM,
wherein the node forming the multicast group stores a number of child nodes which are a GM or a MR,
wherein a joining request (JREQ) message received from a node requesting to join the multicast group is transmitted to other nodes until the JREQ message reaches a node forming the multicast group or a ZigBee coordinator (ZC), and
wherein the node forming the multicast group and receiving the JREQ message increases the number of child nodes which are a GM or a MR by one.

22. A method of managing a ZigBee network including a plurality of nodes, the method comprising:
generating a multicast group which includes at least two nodes among the plurality of the nodes; and
setting a multicast group coordinator (GC) which manages the multicast group among the at least two nodes forming the multicast group,
wherein the multicast group comprises at least one of the GC, a multicast group member (GM) requesting to join the multicast group, and a multicast router (MR) which lines GMs to each other or links the GC and the GM,
wherein the node forming the multicast group stores a number of child nodes which are a GM or a MR,
wherein a joining request (JREQ) message received from a node requesting to join the multicast group is transmitted to other nodes until the JREQ message reaches a node forming the multicast group or a ZigBee coordinator (ZC), and
wherein the ZC receiving the JREQ message sends a GC update (GCUD) message indicating the change of the GC to a new GC and a current GC if the new GC is different from the current GC.

23. A method of managing a ZigBee network including a plurality of nodes, the method comprising:
generating a multicast group which includes at least two nodes among the plurality of the nodes; and
setting a multicast group coordinator (GC) which manages the multicast group among the at least two nodes forming the multicast group,
wherein the multicast group comprises at least one of the GC, a multicast group member (GM) requesting to join the multicast group, and a multicast router (MR) which lines GMs to each other or links the GC and the GM,
wherein the node forming the multicast group stores a number of child nodes which are a GM or a MR,
wherein a joining request (JREQ) message received from a node requesting to join the multicast group is transmitted to other nodes until the JREQ message reaches a node forming the multicast group or a ZigBee coordinator (ZC), and
wherein a node receiving a GC update (GCUD) message which is transmitted from the ZC receiving the JREQ message to the GC in sequence, contains an address of a new joining node, and indicates the change of the GC, determines a parent node a new GC if the requesting node is not a descendant node.

24. A method of managing a ZigBee network including a plurality of nodes, the method comprising:
generating a multicast group which includes at least two nodes among the plurality of the nodes; and setting a multicast group coordinator (GC) which manages the multicast group among the at least two nodes forming the multicast group, wherein the multicast group comprises at least one of the GC, a multicast group member (GM) requesting to join the multicast group, and a multicast router (MR) which lines GMs to each other or links the GC and the GM, wherein the node forming the multicast group stores a number of child nodes which are a GM or a MR, wherein a joining request (JREQ) message received from a node requesting to join the multicast group is transmitted to other nodes until the JREQ message reaches a node forming the multicast group or a ZigBee coordinator (ZC), and wherein a node transmitting a leaving response (LREP) message in the multicast group decreases the number of child nodes which are a GM or a MR by one.

25. The method of claim 24, wherein a GC, which has one child node which is a GM or a MR and does not serve as a GM due to a node leaving the multicast group, sends a GC update (GCUD) message indicating the change of the GC to the child node.

26. The method of claim 25, wherein, if a MR receiving the GCUD message has at least two child nodes which are a GM or a MR, the MR serves a GC.

27. A method of managing a ZigBee network including a plurality of nodes, the method comprising:

generating a multicast group which includes at least two nodes among the plurality of the nodes; and setting a multicast group coordinator (GC) which manages the multicast group among the at least two nodes forming the multicast group, wherein the multicast group comprises at least one of the GC, a multicast group member (GM) requesting to join the multicast group, and a multicast router (MR) which lines GMs to each other or links the GC and the GM, wherein the node forming the multicast group stores a number of child nodes which are a GM or a MR, wherein, if there is a data packet to be delivered to the multicast group, the data packet is transmitted to one of a ZigBee coordinator (ZC) or a GC, and wherein, if there are at least two data packets to be delivered from a source node not being a descendant node of the GC to the multicast group, an ancestor node having the source node and the GC as descendant nodes is determined.

28. The method of claim 27, wherein the source node sends the data packet to the ancestor node.

* * * * *